US009971903B2

(12) United States Patent
Vidhani et al.

(10) Patent No.: US 9,971,903 B2
(45) Date of Patent: May 15, 2018

(54) MASKING OF DIFFERENT CONTENT TYPES

(71) Applicant: Tata Consultancy Services Limited, Mumbai (IN)

(72) Inventors: Kumar Mansukhlal Vidhani, Pune (IN); Devangi Deveshkumar Vyas, Pune (IN); Mayur Jain, Pune (IN); Vijayanand Mahadeo Banahatti, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 238 days.

(21) Appl. No.: 15/074,472

(22) Filed: Mar. 18, 2016

(65) Prior Publication Data
US 2016/0283729 A1    Sep. 29, 2016

(30) Foreign Application Priority Data

Mar. 25, 2015    (IN) .......................... 3533/MUM/2014

(51) Int. Cl.
*G06F 21/62*    (2013.01)
*G06F 17/27*    (2006.01)
*G06F 21/30*    (2013.01)

(52) U.S. Cl.
CPC ...... *G06F 21/6218* (2013.01); *G06F 17/2705* (2013.01); *G06F 21/6209* (2013.01); *G06F 21/6254* (2013.01); *G06F 21/30* (2013.01)

(58) Field of Classification Search
CPC ................................................. G06F 21/6218
See application file for complete search history.

(56) References Cited

U.S. PATENT DOCUMENTS 6,937,730 B1 *    8/2005    Buxton .................. H04N 7/163
                                                  348/E7.061
7,836,508 B2    11/2010    Gumpel et al.
(Continued)

OTHER PUBLICATIONS

Wang et al.; Bottom-up generalization: a data mining solution to privacy protection; Published in: Data Mining, 2004. ICDM '04. Fourth IEEE International Conference on; Date of Conference: Nov. 1-4, 2004; IEEE Xplore.*

(Continued)

*Primary Examiner* — Bradley Holder
(74) *Attorney, Agent, or Firm* — Finnegan, Henderson, Farabow, Garrett & Dunner LLP

(57) ABSTRACT

Systems and methods for masking content of different types are described. The system may implement the method comprising receiving a request to mask input content that includes sensitive and non-sensitive data. The method also comprises parsing the input content to create a content specific structure (CSS) to organize the input content in a structured format. The CSS includes a plurality of CSS nodes. The method analyses each CSS node against a pre-defined privacy policy and identifies sensitivity of the each CSS node. The method also creates a generalized masking structure (GMS) by creating a GMS node corresponding to each CSS node. Each GMS node contains sensitivity information related to corresponding CSS node. Data represented by GMS is masked based upon the sensitivity information stored in it.

14 Claims, 7 Drawing Sheets

(56) References Cited

U.S. PATENT DOCUMENTS

| | | | |
|---|---|---|---|
| 8,881,296 B2* | 11/2014 | Travis | G06F 21/6263 |
| | | | 726/26 |
| 9,489,354 B1* | 11/2016 | Lee | G06F 17/24 |
| 2008/0208579 A1* | 8/2008 | Weiss | G06Q 30/02 |
| | | | 704/244 |
| 2009/0132575 A1* | 5/2009 | Kroeschel | G06F 21/6254 |
| 2010/0270837 A1 | 10/2010 | Edwards | |
| 2013/0227701 A1* | 8/2013 | Caskey | H04M 1/72552 |
| | | | 726/26 |
| 2013/0282697 A1* | 10/2013 | Barbas | G06F 17/30554 |
| | | | 707/722 |
| 2015/0020210 A1* | 1/2015 | Brown | G06F 21/84 |
| | | | 726/27 |
| 2016/0132721 A1* | 5/2016 | Bostick | G06F 21/60 |
| | | | 382/118 |
| 2016/0210473 A1* | 7/2016 | Cohen | G06F 3/013 |

OTHER PUBLICATIONS

Santos et al.; A data masking technique for data warehouses; Published in: Proceeding IDEAS '11 Proceedings of the 15th Symposium on International Database Engineering & Applications; pp. 61-69; Lisboa, Portugal; Sep. 21-23, 2011; ACM Digital Library.*

Wipro Applying Thought, "Enterprise Data Obfuscation (EDO)", Wipro Technologies. 2 pages (2010) http://www.wipro.com/Documents/resouce-center/library/managed-edo.pdf.

* cited by examiner

MASKING OF DIFFERENT CONTENT TYPES

PRIORITY CLAIM

This U.S. patent application claims priority under 35 U.S.C. § 119 to: India Application No. 3533/MUM/2014, filed on 25 Mar. 2015. The entire contents of the aforementioned application are incorporated herein by reference.

TECHNICAL FIELD

This disclosure relates generally to data masking, and more particularly to masking of different types of content.

BACKGROUND

Enterprises are using computers extensively to generate and exchange digital data, for organizing their activities effectively and efficiently. Generally, computers process data to be presented to or exchanged with users in the form of content to provide any intended information. The content may be exchanged with the users within or outside the enterprises for performing critical activities, such as banking transactions, military transactions, and healthcare data exchange. Some of the data within the content may be sensitive, and may not be necessary to be shared with other users. Therefore, such data within the content may be masked before being made available to other users. Further, users, called as authorized users, may have full or partial access to sensitive data. Therefore, sensitive data is masked based on the degree of access given to the authorized users.

In masking process, sensitive content may be obscured by replacing the sensitive content with realistic but not real content.

SUMMARY

Embodiments of the present disclosure present technological improvements as solutions to one or more of the above-mentioned technical problems recognized by the inventors in conventional systems.

In one implementation, a method for masking content of different types, the method comprising receiving a request to mask input content, wherein the input content is of a predefined type, and wherein the input content includes at least one of sensitive content and non-sensitive content; parsing the input content based on the type of content to create a content specific structure (CSS) and organize the input content in content specific structured format, wherein the CSS includes a plurality of nodes and at least one relation among the plurality of nodes; analyzing each CSS node from amongst a plurality of CSS nodes based on a pre-defined policy to identify value corresponding to at least one content attribute associated with the each CSS node, wherein the content attributes include sensitivity attributes; creating generalized masking structure (GMS) including a plurality of GMS nodes and at least one GMS relation among the plurality of GMS nodes, wherein each GMS node corresponds to one CSS node from amongst the plurality of CSS nodes, and the at least one GMS relation corresponds to the at least one CSS relation, and wherein the each GMS node is associated with the at least one content attribute of the corresponding CSS node; and masking the input content based on the created GMS.

In one implementation a system for system for masking sensitive content comprising a processor; a CSS creation module coupled to the processor to parse input content based on the type of input content to create a content specific structure (CSS) and organize the input content in content specific structured format, wherein the CSS includes a plurality of nodes and at least one relation among the plurality of nodes; a sensitivity analyzing module coupled to the processor to analyze each CSS node from amongst a plurality of CSS nodes based on a pre-defined policy to identify value corresponding to at least one content attribute associated with the each CSS node, wherein content attributes include sensitivity attributes; a GMS creation module coupled to the processor to create generalized masking structure (GMS) including a plurality of GMS nodes and at least one GMS relation among the plurality of GMS nodes, wherein each GMS node corresponds to one CSS node from amongst the plurality of CSS nodes, and the at least one GMS relation corresponds to at least one CSS relation, and wherein the each GMS node is associated with the at least one content attribute of the corresponding CSS node; and a data masking module coupled to the processor to mask the input content based on the created GMS.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
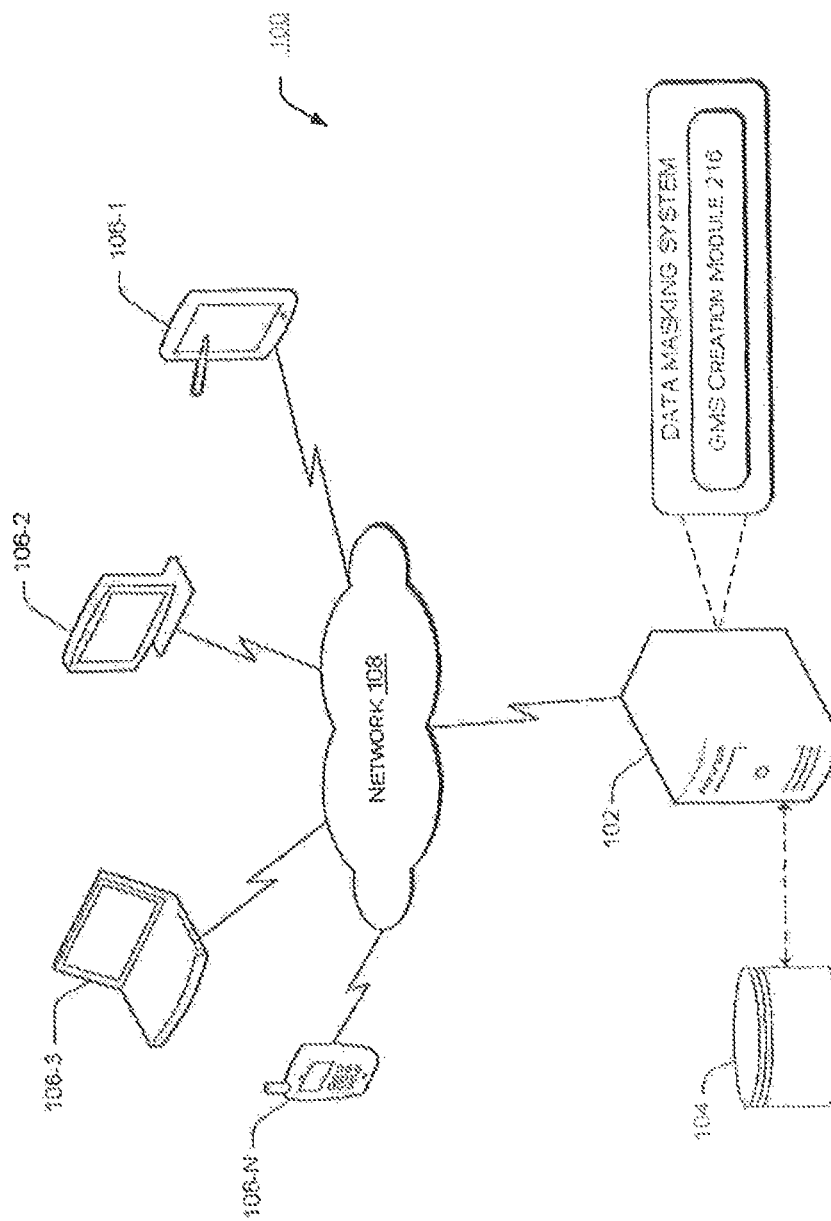
FIG. 1 illustrates a network environment implementing a data masking system, according to an implementation of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for masking content of different types have been described. Different applications used by enterprises generate content in different formats. Some applications may generate content in Extensible Markup Language (XML), while others may generate content in Hyper Text Markup Language (HTML) format. Therefore, generally, applications may generate content in different types, which can be classified into structured and semi-structured format. Structured data format is a format where relation amongst elements of data is predefined. In one example, structured data may be a HTML file including text, such as a user's name, and a numeric value, such as the user's phone number. Examples of semi-structured data format may include responses generated by social media sites, such as Facebook and Twitter, Web server logs, and sensor data generated by RFIDs.

The content generated by enterprises may include sensitive data and non-sensitive data, based on a user with whom the data is being shared. For example, information of a customer of a bank may include customer's name, his phone number, his office and residential address, and his bank account number. If the information of the customer is to be shared with the customer himself, the entire data may be non-sensitive. However, if the same information of the customer is to be shared with some third person, certain aspects of the customer's information may become sensitive information as misuse of the same may potentially harm the customer. Therefore, sharing of the sensitive information with non-privileged users may not be desired. Accordingly, prior to sharing of the sensitive data with non-privileged users, the data may be masked.

In general, several masking processes are used to mask sensitive data within content. Each type of content has different format to organize data components within the content. Therefore, selection of a masking process is based on the type of content and its format. For example, to mask structured data different masking process may be utilized while to mask a semi-structured data, different masking process may be utilized. Since, data structure and data's underlying implementation varies from one format to other, masking processes become dependent on the type of data being masked and also on an underlying implementation of the data. Therefore, different masking processes are to be utilized for different types of data.

According to an implementation of the present subject matter, systems and methods for masking content of different types has been described. In one implementation, the described methods and systems may allow masking of content including different types of data. On one hand, the described methods may allow identification of sensitive data within content, on the other, may also provide methods for efficiently masking the sensitive data.

In operation, sensitive data included with content may be masked based on the described processes to generate masked content. For the sake of explanation, the content processed for the purpose of masking has been referred to as input content hereinafter. It would be appreciated that the input content may be represented in different types of format where the input content includes sensitive data and non-sensitive data.

In one implementation of the present subject matter, the input content may be parsed by utilizing a predefined parser. The predefined parser may be invoked and used to parse a specific type of content. For example, for the input data in HTML format, a parser may be selected that can parse the HTML format. The parser, upon parsing the input content may convert the data into a content specific structure (CSS).

Creation of CSS allows organizing input content in a pre-defined structure such that the input content can be traversed as components of the input content are organized based on their attributes, such as location, size, and type. In an example, the CSS may include multiple nodes and one or more relation among the multiple nodes. Further, the content of each of the multiple CSS nodes may be analyzed based on a pre-defined privacy policy to determine sensitivity of the content of each node.

Further, a generalised masking structure (GMS) may be created from the CSS to create a structure agnostic of the format of the content. By creating the GMS, a process of masking the content may be isolated from the underlying representation of the content. The GMS may be generated by traversing the CSS and creating one node of GMS for each of the CSS nodes. Each relation among the GMS nodes may represent the corresponding relation among the CSS nodes. For the purpose of representation, each node of the GMS may be associated with one or more content attributes, such as a sensitivity attribute, value of which may represent the sensitivity of content within each node. Further, each of plurality of the GMS nodes may also be associated with other GMS attributes, such as a unique number, path, type, reference to CSS node, a list of domain/context words, delimiters, and reference to privacy policy.

In an implementation, the input content is masked based on the created GMS. Based on the GMS, the sensitive data may be identified based on value of the sensitivity attribute of the nodes and, may then be masked for the purpose of data protection. For example, if based on the value of sensitivity attribute of a node the content within the node is identified to include sensitive information; the corresponding data within the input data may be masked. Similarly, if based on the value of the sensitivity attribute of a node, the content within the node is identified to include insensitive information; the corresponding data within the input data may not be masked.

As described earlier, upon masking, masked data is obtained. In one implementation, the masked data may be generated back into an original form, such as PDF, audio clip, and word file, as it was received for the masking. It would be appreciated that the masked content would include masked data, where sensitive information would have been masked based on the techniques described above.

According to the implementations of the present subject matter, content of different types may be masked utilizing the described masking process. Content in different types can be organized in a pre-defined structure by creating CSS. Based on the CSS, GMS is created which is a representation of sensitive attributes of the data contained at the CSS. Masking of data is performed based on information stored in the GMS. Therefore, masking process remains separated from the actual input content and the underlying format of the content.

The above mentioned systems and methods are further described with reference to FIGS. 1 to 4. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and specific examples thereof, are intended to encompass equivalents thereof.

FIG. 1 schematically illustrates a network environment 100, implementing a data masking system 102, according to an example implementation of the present subject matter. In an implementation, the data masking system 102 may be implemented in different operating systems, such as windows and Linux. In an example, the data masking system 102 may be provisioned to provide access to users for the purpose of communication. The data masking system 102 may also be coupled to a database 104 for the purpose of storage of different type of content. The content may either be generated by different applications of an enterprise and be shared with the data masking system 102, or may be provided by the users to the data masking system 102.

The data masking system 102 may also be communicatively coupled to a plurality of user devices 106-1, 106-2, . . . , 106-n through a network 108 for the purpose of communication and exchange of content. Hereinafter, the plurality of user devices 106-1, 106-2, . . . , 106-n are collectively referred as user devices 106, and individually referred to as user device 106. In an implementation, examples of the user devices 106 may include, but are not limited to, a mobile phone, a smart phone, a personal digital assistant (PDA), a tablet, a laptop, and a computer. Although, in FIG. 1, the data masking system 102 has been shown coupled to the user devices 106 through the network 108, the coupling may be established by means of other variations, as would be understood by those skilled in the art.

The network 108 may be a wireless network, a wired network, or a combination thereof. The network 108 can also be an individual network or a collection of many such individual networks, interconnected with each other and functioning as a single large network, e.g., the Internet or an intranet. The network 108 can be implemented as one of the different types of networks, such as Intranet, local area network (LAN), wide area network (WAN), the internet, and such.

In one implementation of the present subject matter, the data masking system 102 may receive content in different types to be masked from the user devices 106, through the network 108. A GMS creation module 216 may convert the received content into a generalized masking structure (GMS) to separate a masking process from underlying representation of the content. The aspect of masking based on creation of GMS has been described along with the explanation of upcoming figures, for the sake of clarity.

Figure 2:
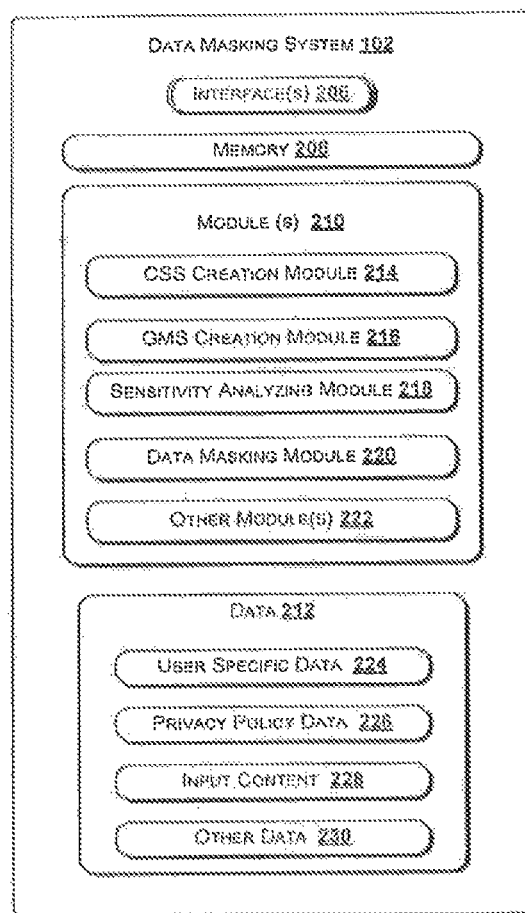
FIG. 2 illustrates the data masking system, according to the implementation of the present subject matter.

FIG. 2 schematically illustrates the data masking system 102. In one implementation, the system 102 may be implemented in different operating environment. The data masking system 102 may include one or more processor(s) 204, interface(s) 206, memory 208 coupled to the processor 204, module(s) 210, and data 212. The processor 204 can be a single processing unit or a number of units, all of which could include multiple computing units. The processor 204 may be implemented as one or more microprocessors, microcomputers, microcontrollers, digital signal processors, central processing units, state machines, logic circuitries, and/or any devices that manipulate signals based on operational instructions. Among other capabilities, the processor 204 is configured to fetch and execute computer-readable instructions and data stored in the memory 208.

The interfaces 206 may include a variety of software and hardware interfaces, for example, interfaces for peripheral device(s), such as a keyboard, a mouse, a display unit, an external memory, and a printer. Further, the interfaces 206 may enable the data masking system 102 to communicate with other devices, such as, the user devices 106, the database 104, web servers, and other external databases. The interfaces 206 can facilitate multiple communications within a wide variety of networks and protocol types, including wired networks, for example, local area network (LAN), cable, etc, and wireless networks, such as Wireless LAN (WLAN), cellular, or satellite. For the purpose, the interfaces 206 include one or more ports for connecting a number of computing systems with one another or to a network.

The memory 208 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the data masking system 102 also includes module(s) 210 and data 212.

The module(s) 210, amongst other things, include routines, programs, objects, components, data structures, etc., which perform particular tasks or implement data types. Further, the module(s) 210 can be implemented in hardware, instructions executed by a processing unit, or by a combination thereof. The processing unit can comprise a computer, a processor, such as the processor 204, a state machine, a logic array, or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the module(s) 210 may be machine-readable instructions (software) which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via a network connection.

In one implementation the module(s) 210 further includes a CSS creation module 214, a GMS creation module 216, a sensitivity analysing module 218, a data masking module 220, and other module(s) 222. The other modules 222 may include programs or coded instructions that supplement applications and functions of the data masking system 102.

The data 212 serves, amongst other things, as a repository for storing data processed, received, and generated by one or more of the module(s) 210. The data 212 includes user specific data 224, privacy policy data 226, input content 228, and other data 230. The other data 230 includes data generated as a result of the execution of one or more modules in the module(s) 210.

According to an implementation, the data masking system 102 may mask input content. In said implementation, the input content may be received through the user devices 106. It would be appreciated that the user devices 106 may include one or more applications that may communicate with the data masking system 102 through the network 108 and the interfaces 206. In such scenario, the input content may be provided by the user devices 106 to the data masking system 102 through the network.

In another implementation, the input content may be fetched by the data masking system 102 from the database 104. The data masking system 102 may either receive a request from the user devices 106 based on which the input content may be fetched from the database 104, or may perform the fetching of the input content based on a predefined policy, such as after every 24 hours.

In one implementation, the CSS creation module 214 creates a content specific structure by parsing the input content 228. Creation of CSS allows organizing input content in a pre-defined structure or semi-structure form such that the input content can be traversed as components of the input content are reachable. The CSS creation module 214 may invoke a predefined parser from a set of different type of parsers, each supporting different type of data. A predefined parser may be invoked that can support a type of the input content 228, for example, HTML parser may be invoked for HTML content. In one aspect, the predefined parser may represent the input content 228 in structured form, such as tree, graph or any other structured/semi-structured form, by creating the CSS. The CSS may include multiple CSS nodes and at least one relation among the CSS nodes.

Figure 3A:
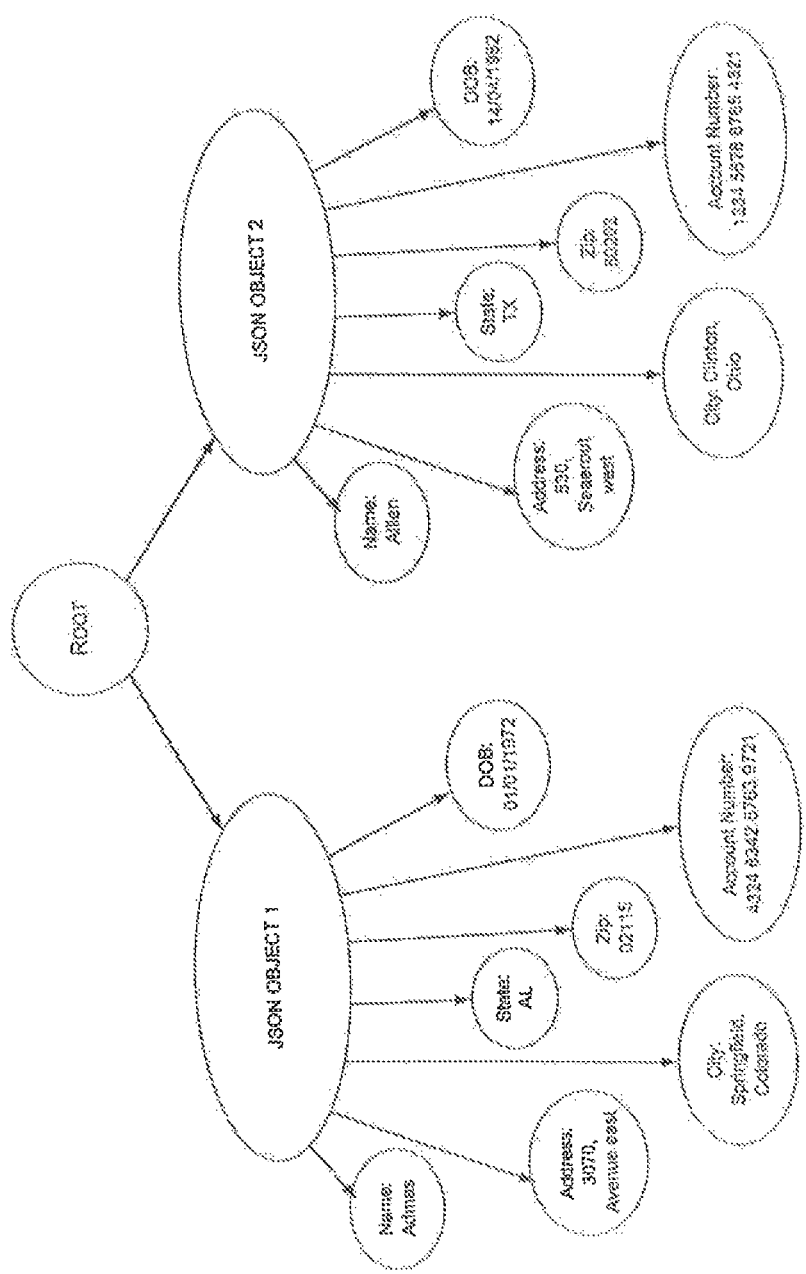
FIG. 3(a) illustrates an example of a content specific structure (CSS), according to the implementation of the present subject matter.

Implementation of CSS is described in FIG. 3(a), where the input content is received as different JSON objects. In such an implementation, Credential attributes of the objects, such as name, address, city, state, zip, account number, and date of birth may be received along with the input content. JSON object1 may include the following data:
"name": "Admas",
"address": "3070, Avenue East",
"city": "Springfield, Colorado",
"State": "AL",
"zip": "02115",
"account_number": "4324 6342 8763 9721",
"DOB": "01/01/1972",
Similarly, JSON object2 may include the following data:
"name":"Allen",
"address":"530, Seaeroute west",
"city":"Clinton, Ohio",
"state":"TX",
"zip":"80202",
"account_number1":"1234 5678 8765 4321
"DOB": "14/04/1982"

The credentials of the objects may include at least one of sensitive and non-sensitive content. At least one CSS node is created for each of the credential of objects, and at least one relation amongst the CSS nodes. As described in FIG. 3(a), a root node is created. One child node of the root node is created for each of the JSON objects, described as JSON object 1 node and JSON object 2 node, collectively referred as JSON object nodes. The JSON object nodes may have at least one child node each, representing data of credential attributes of the JSON object. Number of child nodes of the JSON object nodes may depend upon number of credential attributes of the JSON object, for example, credential attributes of the JSON object 1 include seven credential attributes, such as name, address, city, state, zip, account number, and date of birth (DOB), accordingly, seven child nodes, such as name node, address node, city node, state node, zip node, account number node, and DOB node, are created representing each credential attribute. Accordingly, based on credential attributes of the JSON object 2, include seven credential attributes, 7 child nodes may be created for the JSON object 2 as well.

According to the present subject matter, the GMS creation module 216 of the data masking system 102 may create a generalised masking structure (GMS) based on the CSS. The GMS may be a general structure created to represent sensitivity information of the input content represented by the CSS, but the information is independent from the format of the input content. A sensitivity analyzer may analyze the input content represented by the CSS, and based on results of the sensitivity analyzer, sensitivity information corresponding to the input content may be associated with the GMS. According to the implementation, the GMS creation module 216 may create at least one GMS node and at least one GMS relation among the GMS nodes. Each GMS node may correspond to one CSS node, and each of the GMS relation may correspond to at least one CSS relation.

In one implementation of the present subject matter, the GMS nodes may be associated with content attributes, such as sensitivity attribute, value of which may signify the sensitivity of data within the corresponding CSS node. In said implementation, the sensitivity analyzing module 218 of the data masking system 102 may analyze data represented by each GMS node to identify value of sensitivity attribute associated with each of the plurality of GMS node.

To this end, the sensitivity analysing module 218 may compares the data represented by each of CSS node against a pre-defined privacy policy. In one example, the pre-defined privacy policy may be stored in the database 104. In another implementation, the pre-defined privacy policy may be provided by one of the user devices 106 depending upon the user with which the masked content is to be shared.

As described above, the sensitivity analyser module 218 identifies a value of sensitivity attribute associated with each GMS node by comparing each GMS node against the privacy policy. The value of sensitivity attributes of each GMS node may be identified to be one of a sensitive value and a non-sensitive value. The value may be labelled from one of LABLE, VALUE, BOTH, and/or NONE labels.

Figure 3B:
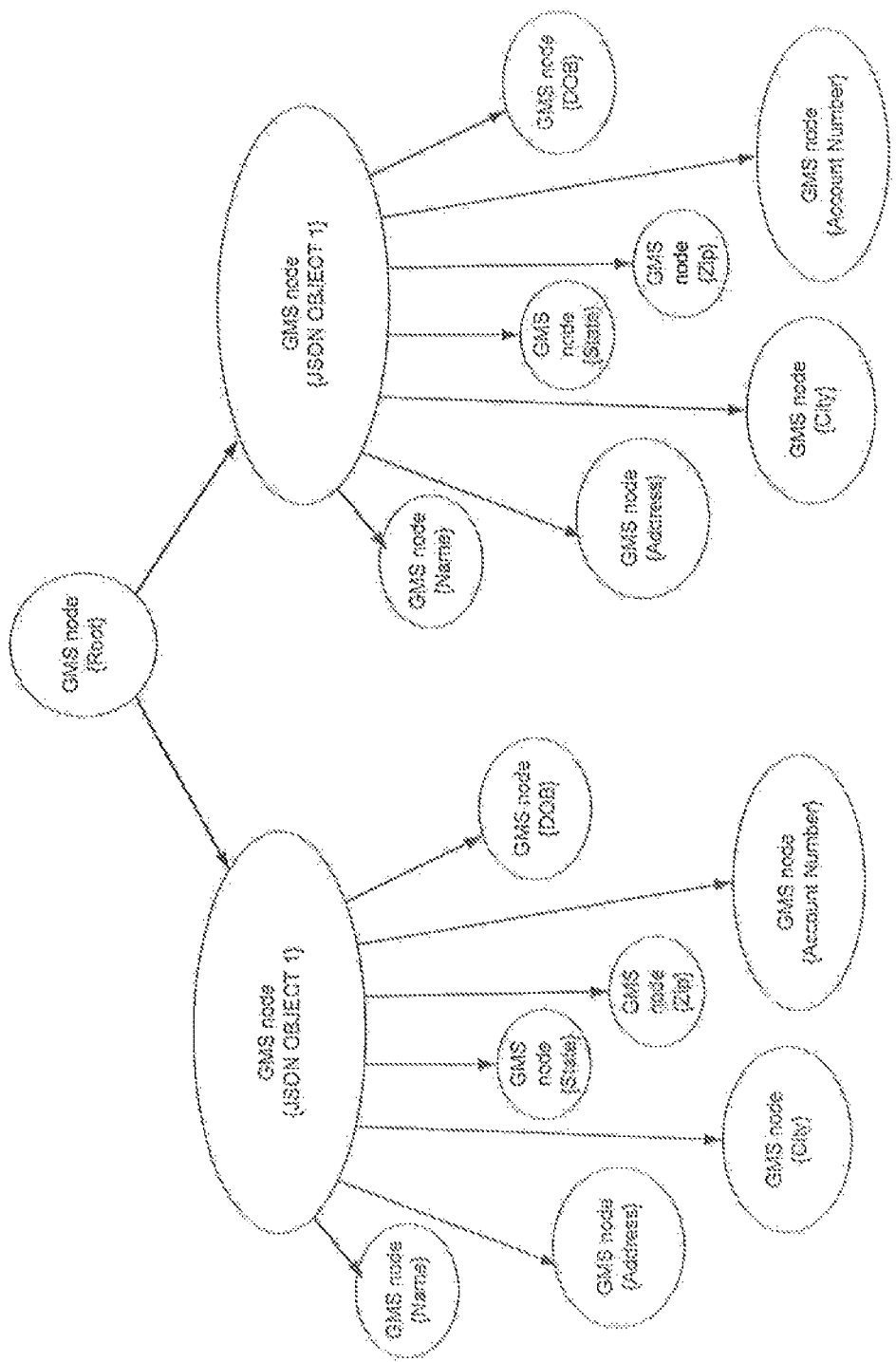
FIG. 3(b) illustrates an example of a generalized masking structure (GMS), according to the implementation of the present subject matter.

In one example, data represented by a CSS node may be in a character string format, in such example a value of sensitivity attributes of the GMS that corresponds to data contained in CSS node may be identified as LABLE sensitive, and the LABLE sensitive content may need not to be masked. In another example, data represented by a CSS node may be in an integer array format, in such example a value of sensitivity attribute of GMS that corresponds to data contained in CSS node may be identified as VALUE sensitive, and the VALUE sensitive content may be masked. In yet another example, a value of sensitivity attributes of GMS node may be identified as BOTH sensitive, where the content is LABLE as well as VALUE sensitive. The BOTH sensitive content may need to be masked. Similarly, a value of sensitivity attributes of GMS node may be identified as NONE sensitive, where the content is not LABLE as well as VALUE sensitive. The NONE sensitive content may need not to be masked. Therefore, based on the sensitivity information stored at the GMS, the data within each corresponding CSS node may be masked. The sensitive information associated with the sensitivity attributes is identified based on the pre-defined privacy policy. For example, FIG. 3(b) describes GMS representation of the CSS created for the received JSON objects as input content. In such example, one GMS node may be created for each CSS node. In FIG. 3(b), a GMS root node may be created in correspondence with the root node of CSS. GMS object 1 node and GMS object 2 node, may be created as child nodes, in correspondence with the JSON object 1 node and the JSON object 2 node of the CSS, respectively. Further, child nodes of the GMS object nodes, such as GMS name node, GMS address node, GMS city node, GMS state node, GMS zip node, GMS account number, and GMS DOB node, may be created in correspondence with CSS nodes like name node, address node, city node, state node, zip node, account number node, and DOB node, respectively.

Also, at least one GMS relation may be created corresponding to each CSS relation. For example, relation between the GMS root node and the GMS object nodes corresponds to the relation between the root node and the JSON object nodes of CSS. The GMS nodes within the GMS, may also be associated with GMS attributes, which may correspond to the content attributes associated with each CSS node. The GMS attributes, apart from the sensitivity attribute, may include different attributes, such as unique number, path, type, reference to CSS element, a list of domain/context words, delimiters, and reference to privacy policy.

In one implementation, based upon information stored in a GMS node corresponding to the identified value of the sensitivity attributes of CSS node, the input content represented by the CSS may be masked by the data masking module 220.

In another implementation, an R-GMS module (not shown in FIG. 2) may convert the GMS into a reduced generalised masking structure (R-GMS) prior to masking the input content. The R-GMS may be created in two steps where at first, at least one set of GMS nodes having same value of sensitivity attributes are identified. Each GMS node of the set of GMS nodes may be merged into a single GMS node.

Figure 3C:
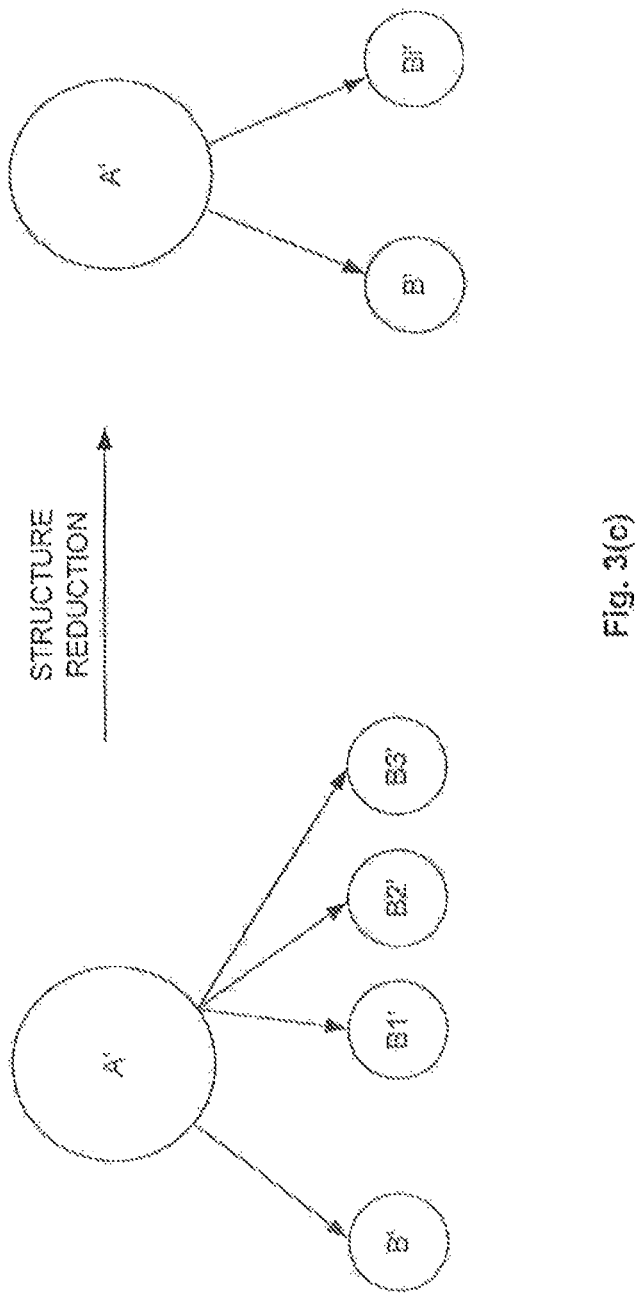
FIG. 3(c) illustrates a GMS reduction technique, according to the implementation of the present subject matter.

FIG. 3(c) illustrates a method step for converting a GMS into an R-GMS. Parent node A' may include four child nodes, namely, B', B1', B2', and B3'. In one example, B1', B2', and B3' nodes may have same value of sensitivity attributes associated with it, while B' may have a different value of the sensitivity attribute than B1', B2', and B3' associated with it. Therefore, GMS nodes B1', B2', and B3' may be merged into a single node, referred as Bi' since they have the same LABLE sensitive parent A. The merging results in structure reduction, wherein the parent node A' may now have only two child nodes, B' and Bi'.

In the second step of reduction of the GMS and creation of the R-GMS, structurally ineffective GMS node and/or set of GMS nodes is removed from the GMS. For example, GMS nodes which are repetitive and represent similar data may be reduced to reduce the total number of nodes. In operation, at least one GMS node and/or a set of GMS node is identified based upon value of sensitivity attributes of the GMS node such that the GMS node and/or the set of GMS node is structural ineffective on non-sensitive GMS nodes. Structural ineffectiveness of the GMS node is identified by comparing the structural properties of the GMS node with the structural properties of other GMS nodes present in the GMS. Identified GMS node or the set of GMS nodes may then be removed from GMS.

Figure 3D:
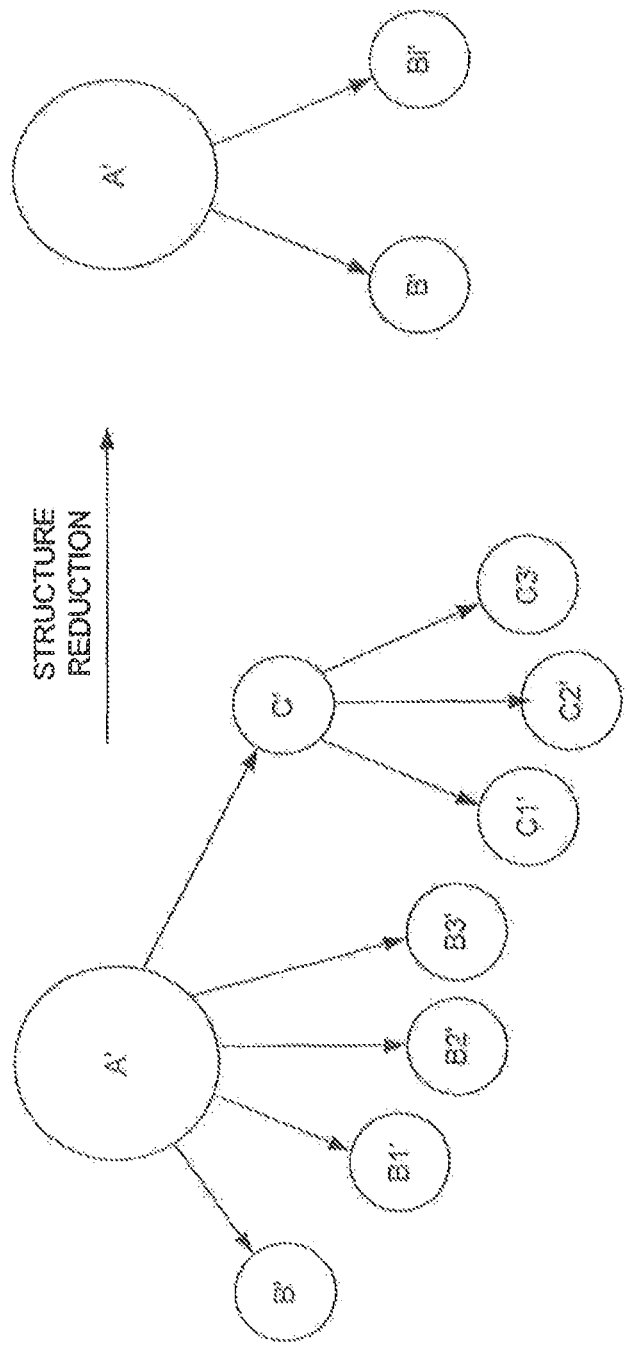
FIG. 3(d) illustrates a GMS reduction technique, according to the implementation of the present subject matter.

Second step of reduction of GMS has been explained in reference with FIG. 3(d) for the sake of clarity. In FIG. 3(d), a parent GMS node A' may have five child GMS nodes B', B1', B2', B3', and C'. The C' GMS node may further have three child GMS nodes referred as C1', C2', and C3'. B1', B2', and B3' nodes may have same value of sensitivity attribute, and therefore B1', B2', and B3' may be merged into a single node, referred as Bi'. Further, C', C1', C2', and C3' may have same value of sensitivity attributes. Upon being identified to be as structurally ineffective, C' node along with associated set of child nodes C1', C2', and C3' may be removed from the GMS. The removal may result in structure reduction, and the parent node A' may be left with merely two child nodes, B' and Bi'. It would be appreciated that since the input content is masked based on the GMS, or the R-GMS, the lesser number of nodes may allow effective data masking of the input content.

According to the implementation, the data masking module 220 may include a masking agent to mask data represented by each CSS node. The data masking module 220 may receive an R-GMS or a set of R-GMSs, to mask the input content.

In one implementation, the R-GMS may be compared with a pool of pre-stored R-GMSs to identify a pre-stored R-GMS, to be similar to the created R-GMS. In operation, the data masking system 102 may store a pool of R-GMSs with different structures and properties. For example, the pool of R-GMSs may include different R-GMSs with different cardinalities, and different relations. The created R-GMS may be compared with the pool of R-GMSs to identify structurally equivalent RGMSs. For example, if there are two R-GMSs, namely, R-GMS-A and R-GMS-B, in order for them to be structurally equivalent, the cardinality of both the R-GMSs has to be equal:

|RGMS-$A$|=|RGMS-$B$|.

Similarly, to be structurally equivalent, relations of each R-GMS node of R-GMS-A is to be similar to relations of each R-GMS A node of R-GMS-B, i.e.,

|GMS relations(node$A$)|=|GMS relations(node$B$)|

If the created R-GMS is identified to be structurally equivalent to an existing R-GMS from amongst the pool of pre-stored R-GMSs, say a first R-GMS and the second R-GMS, both the RGMSs may be sent for masking. Masking of identified structurally equivalent RGMSs results faster and accurate data masking. However, in case a pre-stored R-GMS is not identified to be structurally similar to the created R-GMS, the created R-GMS may be used for the purpose of masking, and may also be stored within the pool of pre-stored R-GMSs for future comparison.

To above explained subject matter has been further explained by way of examples of masking process of structured and semi-structured data, for the purpose of explanation. It would be understood that the examples provided herein are for the purpose of explanation, and shall not be construed as limiting the scope of the present subject matter. Further, different embodiments and implementations may be implemented for masking of different type of structured and semi-structured content, based on the described methods.

In one example of masking structured data, input content represented as an image may be masked. An Image can be understood as structured data and may be masked based on the described techniques. The CSS for the image may be created by using information obtained from various image processing technologies, such as object detection and face recognition within image. The image processing techniques may detect objects within the input content, i.e., the image. Corresponding to the detected objects, an XML element may be created and, each XML element may be represented by a CSS node of the CSS. For example, background of the image may be represented by a root node of the CSS. Similarly, each object of the image content may be detected and represented by a CSS node within the CSS.

Relationship between the CSS nodes may also be defined based on association between the detected objects of the image content, for example, if object A and object B are detected to be within a same container then corresponding CSS nodes may be created at a same level, being sibling nodes. In case, an object further contains another object within it, a parent node may be created for the object and a child node of the parent node may be created for another object. Once the CSS is created, the CSS may be converted into the GMS by creating a GMS node that corresponds to a CSS node and relationship between GMS nodes is defined by association between corresponding CSS nodes. The GMS, then, may be reduced into an RGMS. The RGMS may be sent to a masking agent for masking and sensitive content may be accordingly masked.

In another example, the input content may be received in a table format. In the example, an organization, say ABC Pvt. Ltd., may include more than one thousand employees on its payroll. Every month, the ABC Pvt. Ltd. produces a salary slip mentioning compensation data of each employee in table format, as shown below, and the salary slip is then sent to the each employee through e-mail. In the compensation policy of the employees, the ABC Pvt. Ltd. has introduced a new policy, special allowance. The special allowance makes huge difference to compensation of the employee, and hence, considered as a sensitive component that is to be protected during e-mail communication.

In said example, two different salary slips of employees of ABC Pvt. Ltd. have been analyzed. The two employees may be, namely, JOHN SMITH and STEPHEN SANDY. The both salary slips, as represented in Table 1 and Table 2, may include same structure and compensation components. In order to mask the special allowance components from the both salary slips, a field containing sensitive information, i.e., the special allowance component, may be identified while creating a CSS.

TABLE 1

JOHN SMITH

| Employee Details | | Bank Payment Details | | Additional Information | |
|---|---|---|---|---|---|
| Employee No. | 91010202 | CITI Bank | 0019202020303 | Location | Bandra, Mumbai |
| Designation | Consultant-A | Days paid | 30 | Deputation | Permanent |

| Salary Breakup | Amount | Deduction | Amount |
|---|---|---|---|
| Basic pay | 20000 | Uncometax | 1289 |
| Travel allowance | 9000 | Profession tax | 250 |
| Special allowance | 24000 | — | |
| Total Earnings | 90000 | Total Deduction | 6000 |

TABLE 2

STEPHEN SANDY

| Employee Details | | Bank Payment Details | | Additional Information | |
|---|---|---|---|---|---|
| Employee No. | 71018292 | CITI Bank | 9216730927 | Location | Bandra, Mumbai |
| Designation | Consultant-B | Days paid | 30 | Deputation | Permanent |

| Salary Breakup | Amount | Deduction | Amount |
|---|---|---|---|
| Basic pay | 28000 | Income tax | 9890 |
| Travel allowance | 39000 | Profession tax | 900 |
| Special allowance | 82000 | — | |
| Total Earnings | 180000 | Total Deduction | 32000 |

Salary slip of JOHN SMITH may be parsed to identify the field containing the special allowance component. The procedure may be repeated for the salary slip of STEPHEN SANDY to identify the special allowance component and so on. Thus, the procedure may be repeated thousand times to identify the special allowance component from thousand salary slips. In the described example, the CSS may be converted into a GMS. The GMS may contain sensitivity information related to the CSS, such as the special allowance component is identified as a sensitive component and may be masked. The GMS, then, may be reduced into an RGMS. The RGMS may be sent to a masking agent for masking and sensitive content may be accordingly masked.

In another example, masking process for semi-structured data has been described. An audio file, including conversation between two members, such a customer and a bank executive may be received as input content for the purpose of masking. The audio conversation between the customer and the bank executive may be as follows:

Customer: Hello, I am Adrian and a customer of XYZ bank. I have forgotten my Internet banking password.

Bank executive: Could you please tell me your account number?

In another example of masking process, it is illustrated that call records, organized in different file formats, may confined sensitive data that can be masked by the masking process. In the example, MNP Ltd. has been awarded a contract of selling products of XYZ Bank to its customers. Experienced employees of the MNP are allowed to utilise licensed software to keep call records of the customers of the XYZ bank. Different employees of the MNP Ltd. may generate different sets of call records and store at some location in the licensed software. For example, if employee 'A' of the MNP Ltd. creates call records of M customer of the XYZ bank, the call records may be created in an open office format. Similarly, if an employee 'B' of the MNP Ltd., creates call records of several customer of the XYZ bank, the call records may be organized in a Microsoft Word format. Regardless of the format in which the input content has been organized, masking process may be achieved. As illustrated below, an account number may be a sensitive component that may have to be masked. The account number may be identified as the sensitive component while creating a CSS, regardless of whether the input content is represented as the Open Office document or the Microsoft Word document.

TABLE 3

Call records - Open Office document

| | Name of Customers | Product | Call time | Duration | Account Number | Remark |
|---|---|---|---|---|---|---|
| 1 | George Sangel | Personal loan | 11:30:00 AM | 4 | 98101283837283800 | Customer agreed |
| 2 | Alex Wsugh | Home loan | 02:00:00 PM | 9 | 68158382167828400 | Customer will think |

TABLE 4

Call records - Microsoft word document
Call records:

| Sr No | Name of Customer | Product | Call time | Duration (In Mins) | Account Number | Remark |
|---|---|---|---|---|---|---|
| 1 | LISA TRIVOLTA | Credit card | 10:30 AM | 7 | 789202920914 | Not interested |
| 2 | HERMAN SHEIKH | Car loan | 5:00 PM | 20 | 682829438493 | Will take loan |

Customer: Its ONE ONE TWO THREE TWO THREE

Bank executive: Thank you.

Similar to the masking process of structured data, objects within audio conversation, such as a customer and a bank executive, may be identified. The CSS nodes that correspond to the identified objects may accordingly be created. In this example, a customer CSS node may be created corresponding to the object customer. The object customer may contain further objects within t such as name of the customer and his account number of the bank account. Child nodes of the customer CSS node may be created to represent data related to the name of the customer and his account number. Relationship between the CSS nodes may be defined based on relationship between corresponding audio conversation objects. Once the CSS is created, the CSS may be converted into the GMS by creating a GMS node that corresponds to a CSS node and relationship between GMS nodes is defined by association between corresponding CSS nodes. The GMS, then, may be reduced into an RGMS. The RGMS may be sent to a masking agent for masking and sensitive content may be accordingly masked.

GMS creation enables the masking process of multiple input contents organized in different formats to be merged into single execution instance of masking. A single GMS may be created for the multiple input contents, organized in different formats. In such masking processes, the documents are related to each other till GMS creation, but in subsequent step, the documents are executed independently to store relevant RGMSs into the repository.

Figure 4:
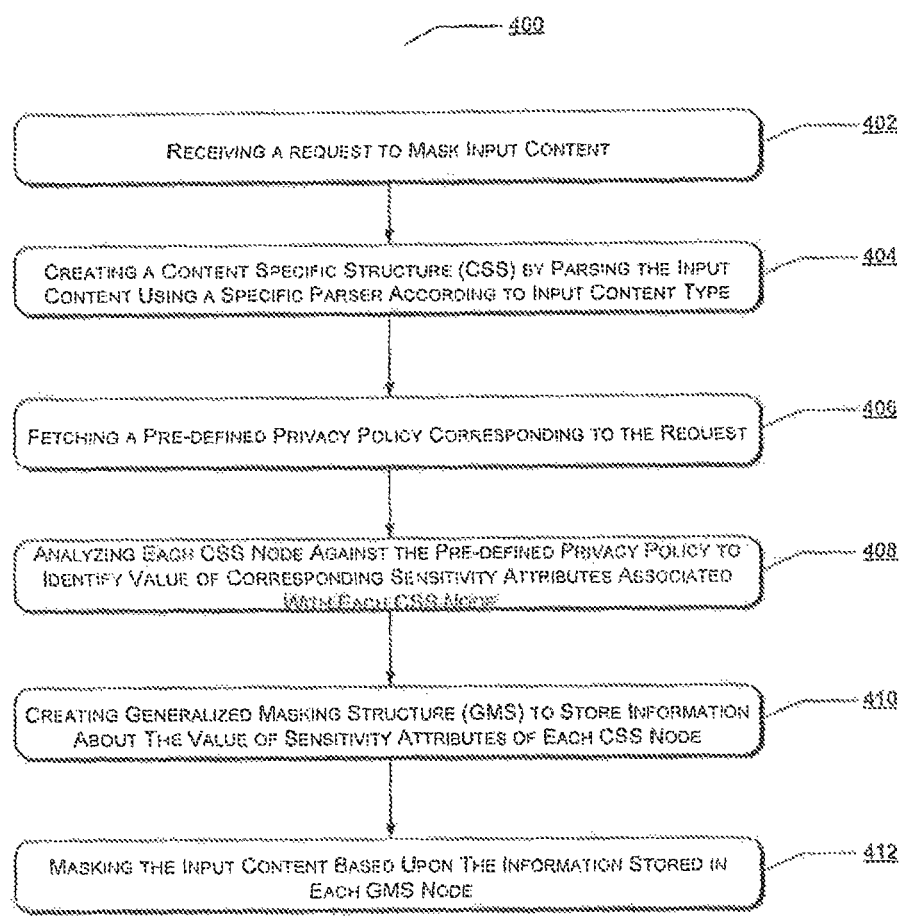
FIG. 4 illustrates a method for masking content of different types, according to the implementation of the present subject matter.

FIG. 4 illustrates a method 400 for masking content of different types, according to an embodiment of the present subject matter. The method 400 may be described in the general context of computer executable instructions. Generally, computer executable instructions can include routines, programs, objects, components, data structures, procedures, modules functions, etc., that perform particular functions or implement particular abstract data types. The method 400 may also be practiced in a distributed computing environment where functions are performed by remote processing devices that are linked through a communications network.

Referring to FIG. 4, at block 402, the method includes receiving a request, to mask an input content. In one implementation, the data masking system 102 may receive the request from a user through the user device 106. In another example, the data masking system 102 may receive the request directly from an application which schedules masking of input content. The input content may either be provided along with request, or may be stored separately, such as in a database. In one implementation, the request may include, but not limited to, an input content, a pre-defined privacy policy, an authentication signature, and/or authentication parameters.

At block 404, a content specific structure (CSS) is created by parsing the input content. Based on input content type, a predefined parser may be selected to parse the input content. For example, html parser is invoked for html input content. The specific parser may represent the input content in structured form, such as tree and graph, by creating multiple CSS nodes and at least one relation among the multiple CSS nodes. Each of the plurality of CSS nodes contains data within it.

At block 406 a pre-defined privacy policy may be fetched to analyze the input content. In one example, the pre-defined privacy policy may be fetched from a database. In one example, the pre-defined privacy policy may be received along with the request for masking the input content, at the block 402. In yet another example, the pre-defined privacy policy may be received directly from the user.

According to an implementation, at block 408, each CSS node may be analysed against pre-defined privacy policy to identify value of corresponding sensitivity attributes. Depending upon the pre-defined privacy policy, the value of sensitivity attributes of each CSS may be labelled as LABLE, VALUE, BOTH, or NONE.

At block 410, a generalised masking structure (GMS) may be created, according to an implementation of the present subject matter. At least one GMS node or a plurality of GMS nodes and at least one GMS relation among the plurality of GMS nodes may be created. Each GMS node may correspond to one CSS node of the multiple CSS nodes, and at least one GMS relation corresponds to at least one CSS relation. Each GMS node may contain sensitivity attributes and may be associated with one or more content attributes, such as sensitive attribute location of the GMS node in the structure, and number of other GMS nodes, present in the GMS, associated with the GMS node.

At the block 412, the input content may be masked according to the information stored in each GMS node of the GMS. In one implementation, each GMS node may be received by a masking agent, and input content represented by the GMS node may be masked, based upon the value of sensitivity attribute associated with the GMS node. In another implementation, a reduced GMS (R-GMS) may be created from the GMS. The R-GMS may include lesser nodes and lesser relations as compared to the GMS. Further, the masking agent may calculate the accuracy of the masking process by using information related to received RGMS or RGMSs. The information may include parameters, such as number of LABLE sensitive nodes, location information of LABLE sensitive nodes, and difference between locations of each pair of LABLE sensitive node.

Once the masking process is completed, the input content, which was parsed through a content specific parser to create a CSS, may again be parsed to convert the input content back in its original format and generate the masked content.

Although embodiments for methods and systems for masking different types of content have been described in a language specific to structural features and/or methods, it is to be understood that the invention is not necessarily limited to the specific features or methods described. Rather, the specific features and methods are disclosed as exemplary embodiments for masking data of different types.

What is claimed is:

1. A processor-executable method for masking content of different types, the method comprising:
   receiving, via one or more hardware processors, a request to mask input content, wherein the input content includes at least one of sensitive type content and non-sensitive type content;
   parsing the input content, via the one or more hardware processors, based on the type of content, to create a content specific structure (CSS) and organize the input content in content specific structured format, wherein the CSS includes a plurality of nodes and at least one relation among the plurality of nodes;
   analyzing, via the one or more hardware processors, each CSS node from amongst the plurality of CSS nodes, based on a pre-defined policy, to identify a value corresponding to at least one content attribute associated with the each CSS node wherein content attributes include sensitivity attributes;
   creating, via the one or more hardware processors, a generalised masking structure (GMS) including a plurality of GMS nodes and at least one GMS relation among the plurality of GMS nodes, wherein each GMS node corresponds to one CSS node from amongst the plurality of CSS nodes, and the at least one GMS relation corresponds to at least one CSS relation, and wherein each GMS node is associated with the at least one content attribute of the corresponding CSS node; and
   masking, via the one or more hardware processors, the input content based on the created GMS;
   wherein masking further comprises creating, via the one or more hardware processors, a reduced generalised masking structure (R-GMS) from the GMS based on a value of sensitivity attributes of each GMS node; and
   wherein creating the R-GMS further comprises:
   identifying, via the one or more hardware processors, at least one set of GMS nodes from amongst a plurality of GMS nodes of a GMS with a same value of sensitivity attributes, and
   grouping the GMS nodes of the identified set of GMS nodes into a single GMS node.

2. The method of claim 1 further comprises storing the R-GMS to a pool of stored R-GMSs.

3. The method of claim 1, wherein creating the R-GMS further comprises:
   identifying, via the one or more hardware processors, a first set of GMS nodes from amongst the plurality of GMS nodes with a same value of sensitivity attributes, wherein the value of sensitivity attributes of the first set of GMS nodes is non-sensitive; and
   removing, via the one or more hardware processors, the first set of GMS nodes from the GMS, wherein the first set of GMS nodes is structurally ineffective on other non-sensitive GMS nodes, and wherein structural ineffectiveness is based on structural properties associated with the first set of GMS nodes.

4. The method of claim 3 further comprising:
   identifying, via the one or more hardware processors, a second set of GMS nodes associated with the first set of GMS nodes, wherein the second set of GMS nodes and the first set of GMS nodes have the same value of sensitivity attributes; and removing, via the one or more hardware processors, the second set of GMS nodes from the GMS, wherein the second set of GMS nodes is structurally ineffective on the other GMS nodes, and wherein structural ineffectiveness is based on structural properties of the GMS nodes.

5. The method of claim 1 further comprises:

comparing, via the one or more hardware processors, the R-GMS with a pool of stored R-GMSs to identify at least one stored R-GMS with equivalent structure to that of the R-GMS;

retrieving, via the one or more hardware processors, masking information corresponding to the equivalent structure from a repository; and masking, via the one or more hardware processors, the input content, based on the retrieved masking information, by sending the R-GMS for masking.

6. The method of claim 5, wherein the masking the input content further comprises, in absence of the equivalent structures, masking the input content, based on the created GMS, by sending the R-GMS for masking.

7. The method of claim 1, wherein the request further includes authentication parameters and an authentication signature.

8. The method of claim 1, wherein structural properties of each of the plurality of GMS nodes include a location of the GMS node in the GMS and a number of GMS nodes associated with the GMS node.

9. A data masking system for masking sensitive content comprising:

a hardware processor; and a memory coupled to the hardware processor and storing processor-executable instructions to:

receive, via the hardware processor, a request to mask input content, wherein the input content includes at least one of sensitive type content and non-sensitive type content;

parse, via the hardware processor, input content based on the type of input content to create a content specific structure (CSS) and organize the input content in content specific structured format, wherein the CSS includes a plurality of nodes and at least one relation among the plurality of nodes;

analyze, via the hardware processor, each CSS node from amongst a plurality of CSS nodes, based on a pre-defined policy, to identify a value corresponding to at least one content attribute associated with the each CSS node, wherein content attributes include sensitivity attributes;

create, via the hardware processor, a generalised masking structure (GMS) including a plurality of GMS nodes and at least one GMS relation among the plurality of GMS nodes, wherein each GMS node corresponds to one CSS node from amongst the plurality of CSS nodes, and the at least one GMS relation corresponds to at least one CSS relation, and wherein the each GMS node is associated with the at least one content attribute of the corresponding CSS node; and mask, via the hardware processor, the input content based on the created GMS;

wherein masking further comprises creating, via the hardware processor, a reduced generalised masking structure (R-GMS) from the GMS based on a value of sensitivity attributes of each GMS node; and wherein creating the R-GMS further comprises:

identifying, via the hardware processor, at least one set of GMS nodes from amongst a plurality of GMS nodes of a GMS with a same value of sensitivity attributes, and grouping the GMS nodes of the identified set of GMS nodes into a single GMS node.

10. The data masking system of claim 9, wherein the R-GMS creation the memory further storing processor-executable instructions to:

identify, via the hardware processor, a first set of GMS nodes from amongst the plurality of GMS nodes with a same value of sensitivity attributes, wherein the value of sensitivity attributes of the first set of GMS nodes is non-sensitive; and remove, via the hardware processor, the first set of GMS nodes from the GMS, wherein the first set of GMS nodes is structurally ineffective on other non-sensitive GMS nodes, and wherein structural ineffectiveness is based on structural properties associated with the first set of GMS nodes.

11. The data masking system of claim 10, the memory further storing processor-executable instructions to:

identify, via the hardware processor, a second set of GMS nodes associated with the first set of GMS nodes, wherein the second set of GMS nodes and the first set of GMS nodes have the same value of sensitivity attributes; and remove, via the hardware processor, the second set of GMS nodes from the GMS, wherein the second set of GMS nodes is structurally ineffective on the other GMS nodes and wherein structural ineffectiveness is based on structural properties of the GMS nodes.

12. The data masking system of claim 9, the memory further storing processor-executable instructions to store the R-GMS to a pool of stored R-GMSs.

13. The data masking system of claim 9, the memory further storing processor-executable instructions to:

compare, via the hardware processor, the R-GMS with a pool of stored R-GMSs to identify at least one stored R-GMS with equivalent structure to that of the R-GMS;

retrieve, via the hardware processor, masking information corresponding to the equivalent structure from a repository; and mask, via the hardware processor, the input content, based on the retrieved masking information, by sending the R-GMS for masking.

14. A non-transitory computer-readable medium having embodied thereon computer program instructions for:

receiving, via a hardware processor, a request to mask input content, wherein the input content is of a pre-defined type, and wherein the input content includes at least one of sensitive type content and non-sensitive type content;

parsing, via the hardware processor, the input content, based on the type of content, to create a content specific structure (CSS) and organize the input content in content specific structured format, wherein the CSS includes a plurality of nodes and at least one relation among the plurality of nodes;

analyzing, via the hardware processor, each CSS node from amongst the plurality of CSS nodes, based on a pre-defined policy, to identify a value corresponding to at least one content attribute associated with the each CSS node, wherein content attributes include sensitivity attributes;

creating, via the hardware processor, a generalised masking structure (GMS) including a plurality of GMS nodes and at least one GMS relation among the plurality of GMS nodes, wherein each GMS node corresponds to one CSS node from amongst the plurality of CSS nodes, and the at least one GMS relation corresponds to at least one CSS relation, and wherein each GMS node is associated with the at least one content attribute of the corresponding CSS node; and masking, via the hardware processor, the input content based on the created GMS;

wherein masking further comprises creating, via the hardware processor, a reduced generalised masking structure (R-GMS) from the GMS based on a value of sensitivity attributes of each GMS node; and wherein creating the R-GMS further comprises:

identifying, via the hardware processor, at least one set of GMS nodes from amongst a plurality of GMS nodes of a GMS with a same value of sensitivity attributes, and grouping the GMS nodes of the identified set of GMS nodes into a single GMS node.

* * * * *